United States Patent [19]

Mouries

[11] Patent Number: 4,685,027
[45] Date of Patent: Aug. 4, 1987

[54] HIGH CURRENT CAPACITOR AND METHOD FOR MANUFACTURING THE SAME

[75] Inventor: Gérard Mouries, Seurre, France

[73] Assignee: Compagnie Europeenne De Composants Electroniques LCC, Courbevoie, France

[21] Appl. No.: 869,878

[22] Filed: Jun. 3, 1986

[30] Foreign Application Priority Data

Jun. 6, 1985 [FR] France ................. 85 08537

[51] Int. Cl.⁴ .................. H01G 1/13; H01G 7/00
[52] U.S. Cl. ................................ 361/308; 29/25.42
[58] Field of Search .............. 29/25.42; 361/306, 308, 361/309, 310, 323

[56] References Cited

U.S. PATENT DOCUMENTS

| | | | |
|---|---|---|---|
| 1,599,853 | 9/1926 | Toelle | 361/308 X |
| 1,599,859 | 9/1926 | Wilson et al. | 361/308 |
| 2,930,714 | 3/1960 | Netherwood | 361/323 X |
| 3,458,783 | 7/1969 | Rosenberg | 361/308 |
| 3,539,885 | 11/1970 | England | 361/308 |
| 3,593,072 | 7/1971 | Bailey | 361/308 X |
| 3,864,798 | 2/1975 | Utner | 361/308 X |

Primary Examiner—Donald A. Griffin
Attorney, Agent, or Firm—Oblon, Fisher, Spivak, McClelland, & Maier

[57] ABSTRACT

The present invention concerns a high current capacitor and a method for producing the same, said capacitor being of the type obtained by winding at least two metallized dielectric films, while electrical connections are provided by schooped areas on the lateral edges of the films and by a connecting terminal for connecting each schooped area with an external circuit, said terminal being constituted by a cap-shaped element which covers the schooped area and is electrically connected thereto by a conductive element; the invention applies particularly to protection capacitors for trigger extinction thyristors.

9 Claims, 5 Drawing Figures

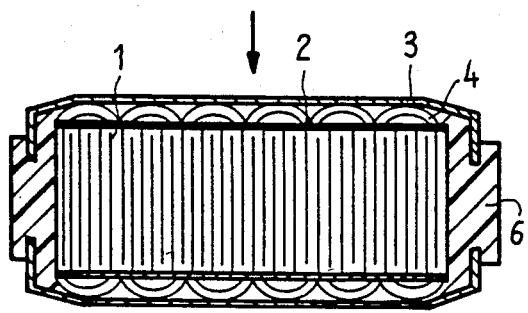
FIG_1
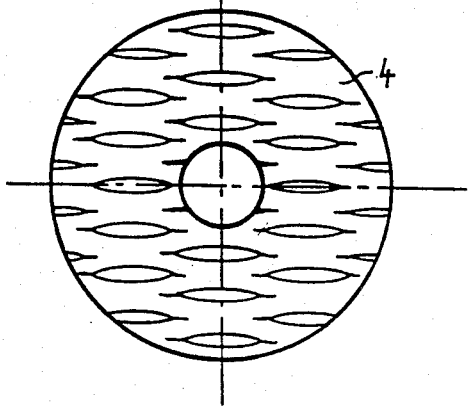
FIG_2
FIG_3
FIG_4
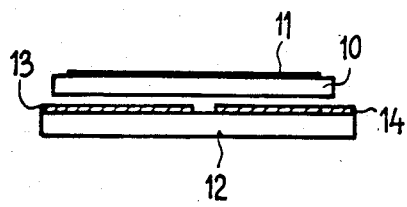
FIG_5
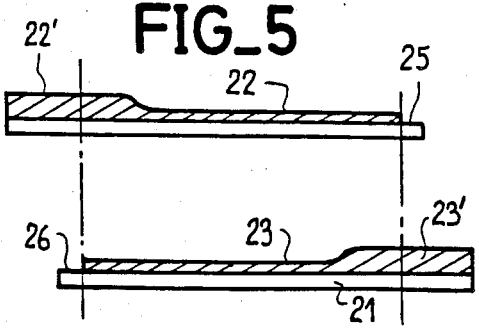

HIGH CURRENT CAPACITOR AND METHOD FOR MANUFACTURING THE SAME

BACKGROUND OF THE INVENTION

1. Field of the invention

The present invention concerns high current capacitors and more particularly wound type high current capacitors as well as a method for manufacturing such capacitors.

2. Description of the prior art

These capacitors are generally obtained through winding at least two metallic dielectric films which, in the case of high currents, are relatively narrow and wound at a large diameter with respect to their width. These capacitors comprise electric connections produced in a manner known per se by schooping the lateral edges of the films as well as a connecting terminal for connecting the schooped areas to an external electric circuit. The wound type high current capacitors presently commercially available present a series inductance of about 50 to 100 nH. Now, recently a need has arisen for high current wound type capacitors, having a very low series inductance. Such capacitors are used especially as protection capacitors for novel trigger extinction thyristors, known under the denomination GTO. In fact, these thyristors require protection capacitors having a very low series inductance of only several nH and capable of withstanding peak currents of about 1000 A.

The terms of "schooping", "schoopage", "schooped" as used herein refer to the known process of metallizing a surface by flame-spraying as specified by its inventor SCHOOP. Thus, the expression "schooping" designates herein the metallizing operation carried out in accordance with said process, and the expression "schooped area" designates herein the metallized surface resulting therefrom.

Consequently, the present invention aims at providing a high current capacitor that presents a very low series inductance.

The object of the present invention is thus to provide a high current capacitor of the type produced through winding at least two metallic dielectric films and comprising electrical connections obtained by schooping the lateral edges of the films as well as an electric connecting terminal for connecting each schooped area with an external circuit, wherein each connecting terminal is constituted by a cap-shaped element made of a conductive material covering the schooped area and by means achieving an electrical connection between the schooped area and the said cap-shaped element.

According to one preferred embodiment, the means achieving the electrical contact between the schooped area and the cap-shaped element are constituted by a metallic element provided on each side with protruding parts. This metallic element is preferably constituted by a washer made of swaged metal. However, other type of metallic elements can be utilized, especially a forged metal washer. On the other hand, the metallic element is preferably made of a resilient copper alloy such as brass which can be tinned in order to ensure its protection.

According to another feature of the present invention, the cap-shaped element is preferably made of aluminum. For wound capacitors, the said element can be produced from a tube bottom.

According to yet another feature of the present invention, the capacitor is covered with an epoxy-type hard resin or any other thermosetting resin. This resin ensures in particular the mechanical connection and the climatic protection of the assembly.

The present invention also concerns a method of manufacturing a capacitor such as described hereinabove. This method comprises the steps of winding up in manner known per se at least two metallized dielectric films, schooping the lateral edges of the films, positioning, on each one of the thus schooped areas means providing an electric connection, covering each schooped area with a cap-shaped element, applying a clamping pressure to render the different elements integral with one another and coating the thus obtained assembly with a hard resin.

A very flat capacitor is thus obtained, the connection area of which is constituted by the entire external surface of the cap-shaped element. The mounting of this capacitor is similar to that of semiconductors, thereby allowing it to be mounted on the same radiator. Therefore, the stray selfs due to the connections are reduced to a minimum and the resistive losses due to the connection system are practically null.

BRIEF DESCRIPTION OF THE DRAWINGS

Other features, advantages and objects of the present invention will appear from the following description of an embodiment, given with reference to the appended drawings in which:

FIG. 1 represents a longitudinal cross-sectional view of a capacitor according to the present invention;

FIG. 2 represents a plan view from above of a washer made of swaged metal such as utilized in the present invention;

FIG. 3 is a cross-sectional view of the washer of FIG. 2 placed on the schooped area; and FIGS. 4 and 5 are different section views of films able to be utilized in accordance with the present invention.

DESCRIPTION OF THE PREFERRED EMBODIMENT

FIG. 1 represents a high current capacitor according to the present invention which is constituted by metallized films 1 of a small width, which are wound up according to a diameter the value of which is great with respect to their width. Different types of metallized films can be utilized to obtain a high current capacitor. As represented in FIG. 4, the winding or coil can be produced by utilizing a dielectric strip 10 covered with a central metallization layer 11 alternated with a dielectric strip 12 covered with two lateral metallization layers 13 and 14. Metallization layer 11 preferably presents a high resistivity in order to improve "self-healing" whereas lateral metallization layers 13 and 14 present a low resistivity in order to improve the passage of the current. Such films are generally utilized to obtain high current capacitors for voltages higher than 1000 volts. For voltages lower than 1000 volts, it is possible to utilize metallized films having strengthened or reinforced edges, such as represented in FIG. 5. In this case, each film is formed by a dielectric strip 20, 21 covered with metallization layers 22, 23, the opposite edges 22', 23' of which are thickened so as to provide a zone of low resistivity which allows high-quality contact with the schooped area. These films advantageously present margins 25, 26 and are wound in relatively shifted positions with respect to one another, as shown in FIG. 5. However, the invention is not limited to the types of films described herein-above. Any type of films allowing to produce high current capacitors can be used.

Whatever the type of film utilized, the lateral edges of the films are provided, in a manner known per se, with a schooped area 2. According to the present invention, electric connecting terminals are provided on each schooped area. Such terminals are essentially constituted by a cap-shaped element 3. This cap-shaped element can be made from the bottom of a cylindrical tube, for example, an aluminum tube, the diameter of which is greater than the diameter of the winding, as represented in FIG. 1. Furthermore, means for establishing the electrical contact between the schooped area and the cap-shaped element 3 are interposed between said schooped area and the said cap-shaped element. These means are constituted in this embodiment by a washer 4 made of swaged metal of the type represented in FIGS. 2 and 3. This washer is made of a conductive material, preferably resilient, i.e. a resilient copper alloy such as brass. This brass could be tinned so as to ensure the protection of the alloy. As clearly shown in FIG. 3, washer 4 presents protruding parts 5 which are preferably positioned on the side of cap-shaped element 3.

When manufacturing the capacitor of FIG. 1, washers 4 are positioned on each schooped area, then the assembly is enclosed within the cap-shaped elements 3 and a clamping pressure is applied onto the outer faces of elements 3, which pressure may be comprised between 0.05 and 1 kg/cm² and will preferably be 0.3 kg/cm². The assembly is then coated with a thermosetting resin 6. This resin confers mechanical strength on the capacitor while protecting it against-climatic influences.

The capacitor according to the present invention is thus very flat and presents a large connecting area. This means that the series inductance is very low, that the current will pass unimpeded and that the thermic impedance is considerably reduced since there is no punctual hot spot.

Due to the fact that the thermic impedance is very low, this type of capacitor is particularly well adapted to cooling by immersion in freon.

By way of example, a capacitor of 4 $\mu$F was produced according to the present invention for a peak voltage of 2000 V and an effective current of 60 A. A capacitor of 90 mm in diameter and 46 mm in thickness overall measurement was obtained by winding two metallized polypropylene films with reinforced edges of 10 $\mu$m maximum thickness. The lateral edges of the films have been metallized by "schooping" thereon successive zinc layers, the total thickness of the schooped area being comprised between 0.5 and 0.8 mm.

According to the present invention, the winding thus obtained was covered with two cap-shaped elements 3 made of aluminum with interposed swaged brass washers in order to ensure electrical contact between the schooped area and the cap-shaped element. The assembly was rendered integral by applying a clamping pressure of 0.2 kg/cm², then by covering it with a thermosetting resin. A capacitor presenting a series inductance lower than 4 nH was thus obtained.

The embodiment described herein-above is given by way of example only and can be subjected to numerous modifications without departing from the scope and spirit of the present invention. In particular, the swaged metal washer can be replaced by a washer made of forged metal or a washer made of a resilient metal presenting protruding parts obtained according to other techniques. Furthermore, the cap-shaped element can be made of a metal other than aluminum; however, the metal used must be a good heat and electric conductor.

What is claimed is:

1. A high current, disc-shaped capacitor of the type produced by winding at least two metallized dielectric films and comprising electrical connections defined by schooped areas provided on the lateral edges of the wound films, and a pair of substantially flat, cap-shaped electric connecting terminals which are formed of an electrically conductive material and which cover said schooped areas and connect each schooped area to an external circuit;
   means for establishing an electrical contact between the schooped area and said cap-element; and
   non-electrically conductive means for sealing the capacitor and for retaining said cap-shaped electrically connecting terminals in position in said capacitor.

2. A capacitor according to claim 1, wherein the means for establishing the electrical contact between the schooped area and the cap-shaped element are constituted by a metallic element provided on each of its sides with protruding portions.

3. A capacitor according to claim 2, wherein the metallic element is a washer made of swaged metal.

4. A capacitor according to claim 2, wherein the metallic element is a washer made of forged metal.

5. A capacitor according to claim 1, wherein the means for establishing the electrical contact between the schooped area and the cap-shaped element is made of a resilient copper alloy.

6. A capacitor according to claim 5, wherein said copper alloy is brass.

7. A capacitor according to claim 5, wherein the alloy is tinned.

8. A capacitor according to claim 1, wherein the cap-shaped element is made of aluminum.

9. A method for producing a capacitor according to claim 1, which comprises the following steps:
   winding at least two metallized dielectric films;
   schooping of the lateral edges of the films to provide schooped areas thereon;
   positioning on each schooped area means for establishing the electrical contact therewith;
   covering with a cap-shaped element each schooped area and the associated means for establishing the electrical contact;
   applying a clamping pressure in order to render integral the different elements of the thus obtained assembly; and
   covering said assembly with a hard resin.

* * * * *